United States Patent
Miki et al.

(10) Patent No.: US 6,641,292 B2
(45) Date of Patent: Nov. 4, 2003

(54) ILLUMINATION AXIS ADJUSTING APPARATUS FOR AUTOMOTIVE HEADLAMPS

(76) Inventors: Katsuya Miki, c/o Mitsubishi Electric Engineering Co., Ltd., 6-2, Otemachi 2-chome, Chiyoda-ku, Tokyo 100-0004 (JP); Hirofumi Doi, c/o Mitsubishi Electric Engineering Co., Ltd., 6-2, Otemachi 2-chome, Chiyoda-ku, Tokyo 100-0004 (JP); Mutsuo Sekiya, c/o Mitsubishi Denki Kabushiki Kaisha, 2-3, Marunouchi 2-chome, Chiyoda-ku, Tokyo 100-8310 (JP)

(*) Notice: Subject to any disclaimer, the term of this patent is extended or adjusted under 35 U.S.C. 154(b) by 13 days.

(21) Appl. No.: 09/867,703

(22) Filed: May 31, 2001

(65) Prior Publication Data
US 2002/0018348 A1 Feb. 14, 2002

(30) Foreign Application Priority Data
May 31, 2000 (JP) .................................. P2000-161869

(51) Int. Cl.[7] .............................................. F21V 17/02
(52) U.S. Cl. ..................... 362/513; 362/515; 362/284; 362/40
(58) Field of Search .................. 362/513, 515, 362/284, 40, 459, 509, 512, 514, 257, 272, 282, 382, 449, 37

(56) References Cited

U.S. PATENT DOCUMENTS

| 2,675,438 | A | * | 4/1954 | Pederson ................. 200/61.54 |
| 2,941,117 | A | * | 6/1960 | Dugle ........................ 250/232 |
| 4,574,334 | A | * | 3/1986 | Igura ......................... 362/270 |
| 5,095,411 | A | * | 3/1992 | Peck et al. ................. 362/286 |
| 5,099,400 | A | * | 3/1992 | Lee ............................ 362/37 |
| 5,673,991 | A | * | 10/1997 | Eickhoff et al. ............ 362/272 |
| 5,993,032 | A | * | 11/1999 | Herbers ..................... 362/515 |
| 6,244,735 | B1 | * | 6/2001 | Burton ....................... 362/421 |
| 6,247,834 | B1 | * | 6/2001 | Suehiro ...................... 362/460 |
| 6,345,905 | B1 | * | 2/2002 | Kibayashi et al. .......... 362/460 |

FOREIGN PATENT DOCUMENTS

| JP | 6-37154 | 5/1994 | ............ B60Q/1/06 |
| JP | 9-63311 | 3/1997 | ............ F21M/3/20 |

* cited by examiner

Primary Examiner—Alan Cariaso
Assistant Examiner—Ismael Negron

(57) ABSTRACT

An illumination axis adjusting apparatus includes a stepping motor integrally having in turn an automatic angle adjusting structure for automatically adjusting the angle of the illumination axis of an automotive headlamp by driving the motor and a manual angle adjusting structure for manually adjusting the angle of the illumination axis of the headlamp.

16 Claims, 8 Drawing Sheets

ILLUMINATION AXIS ADJUSTING APPARATUS FOR AUTOMOTIVE HEADLAMPS

BACKGROUND OF THE INVENTION

1. Field of the Invention

The present invention relates to an illumination axis adjusting apparatus for headlamps of vehicles such as automobiles.

2. Description of the Related Art

In conventional headlamps of vehicles such as automobiles, in order to enable the vertical or horizontal adjustment of the illuminating direction thereof members for determining the illuminating direction (for example, a reflector and a headlamp unit) are mounted in a supporting member such as a casing in such a manner as to be tiltably held thereon, and manual or automatic adjustment driving devices are provided for tilting the illumination direction determining members.

In adjusting the illuminating direction of the headlamps there are employed aiming adjustment and leveling adjustment; the former adjustment is carried out after the headlamps have been assembled to the vehicle body, before the vehicle is used or at the time of inspection (normally the manual adjustment carried out manually), and the latter adjustment is carried out every time the vertical illuminating angle changes as the load exerted to the vehicle changes due to a change in the number of people riding or pieces of luggage placed in the vehicle or to the running condition (normally the automatic adjustment employing a motor or the like).

Conventionally, an aiming adjusting device which is manually operated and a leveling adjusting device which is automatically operated are separately mounted to constitute an illumination axis adjusting apparatus, and in such an adjusting device, it is common that a small DC motor or a stepping motor (a stepper motor) is used to drive the leveling device.

FIG. 8 shows an example of a conventional automotive headlamp device in which an aiming adjusting device and a leveling adjusting device are disposed individually.

In this figure, reference numeral 1 denotes a headlamp unit which is fabricated by combining a front unit 1a and a rear unit 1b after a reflector 4 and the like are accommodated inside. Reference numeral 2 denotes an operating rod for a horizontal aiming adjusting mechanism mounted on one of left- and right-hand sides (here right-hand side) of the back of the headlamp unit. The operating rod 2 has a hexagonal portion 2a at an upper end portion and a gear 2b at a lower end portion thereof. Reference numeral 3 denotes an adjusting rod provided at a rear end portion with a gear 3b which is in mesh engagement with the gear 2b of the operating rod 2. The adjusting rod 3 is provided at a front end portion with a threaded shaft portion, not shown. Provided at a position at an upper portion of the back of the reflector 4 which is closer to one of sides thereof is a nut portion, not shown, in which the threaded shaft portion of the adjusting rod 3 is screwed, whereby the adjusting rod 3 is rotatably connected to the reflector 4.

Reference numeral 5 denotes an operating rod for a vertical aiming adjusting mechanism positioned at an upper portion of the back of the headlamp unit 1 which is closer to the other side thereof (here, on the left-hand side). The operating rod 5 is provided at an upper end portion with a hexagonal portion 5a and a gear 5b at a lower end portion thereof. Reference numeral 6 denotes an adjusting rod provided at a rear end portion thereof with a gear 6b which is in mesh engagement with the gear 5b of the operating rod 5. The adjusting rod 6 is provided at a front end portion with a threaded shaft portion 6a. Provided at a position at the upper portion of the back of the reflector 4 which is closer to the other side thereof is a nut portion 4a in which the threaded shaft portion 6a of the adjusting rod 6 is screwed, whereby the adjusting rod 6 is rotatably connected to the reflector 4.

Reference numeral 7 denotes a stepping motor for a leveling adjusting mechanism. The stepping motor 7 is mounted on the back of the headlamp unit 1 and is located at a position which is spaced away from the vertical aiming adjusting mechanism. An output shaft 8 of the stepping motor 7 is titably connected to the reflector 4 and is adapted to move back and forth when signals are inputted in the stepping motor 7.

Here, the reflector 4 is held in such a condition that the reflector 4 can tilt vertically and horizontally by the output shaft 8 for automatic adjustment, the horizontal aiming adjusting mechanism and the vertical aiming adjusting mechanism.

Consequently, when operating to rotate the operating rods 2 and 5, the adjusting rods 3 and 6 rotate, whereby the reflector 4 tilts on the output shaft 8 acting as a fulcrum to thereby perform an aiming adjustment. In addition, a leveling adjustment is performed in conjunction with the axial movement of the output shaft 8 of the stepping motor 7.

Thus, the stepping motor used itself is not provided with the aiming adjusting mechanism additionally, and therefore the separately provided aiming adjusting mechanism is used to manually adjusting the aiming of the headlamp.

Due to this construction, there are needed three output shafts for required adjustments, and space is also required which is large enough for the disposition of the three adjusting mechanisms.

In addition, as is described in JP-B-6-37154, an illumination axis adjusting apparatus is known in which an adjusting shaft is shared for use between a vertical aiming adjusting mechanism and a leveling adjusting mechanism. However, since a manual adjusting mechanism needs to be provided between a stepping motor and a reflector, the aiming adjusting mechanism cannot integrally be incorporated in the stepping motor itself, and in a case where a stepping motor is used as a driving device for leveling adjustment, since an aiming adjusting device (for vertical aiming adjustment) and a leveling adjusting device are disposed separately, there have been often caused restrictions on the layout of the devices and the other constituent components such as configurations of locations or portions where both the devices are mounted and positional requirements to avoid the interference between the devices and the other constituent members disposed on the periphery thereof.

Since the conventional illumination axis adjusting apparatus is constructed as described above, in a case where a stepping motor is used, an aiming adjusting mechanism for vertical aiming adjustment and a leveling adjusting mechanism are disposed as separate members, and this increases the space required for mounting those mechanisms. In addition, the construction increases the number of points required for fixing the mechanisms to a headlamp body, as well as the number of constituent components, which causes problems of imposing restrictions on the lay out of the increased number of constituent components and resulting in a higher cost.

SUMMARY OF THE INVENTION

The invention was made with a view to solving the problems and an object thereof is to provide an illumination axis adjusting apparatus in which simplified constituent components are used and which can reduce the costs involved.

To attain the object, according to a first aspect of the invention, there is provided an illumination axis adjusting apparatus for automotive headlamps having a stepping motor comprising integrally an automatic angle adjusting structure for automatically adjusting the angle of the illumination axis of an automotive headlamp by driving a motor and a manual angle adjusting structure for manually adjusting the angle of the illumination axis of the automotive headlamp.

According to a second aspect of the invention, there is provided an illumination axis adjusting apparatus for automotive headlamps comprising automatic illumination axis adjusting means having integrally an automatic angle adjusting structure for automatically adjusting the angle of the illumination axis of an automotive headlamp and a manual angle adjusting structure for manually adjusting the angle of the illumination axis of the automotive headlamp, and manual angle adjusting means for manually adjusting the angle of the illumination axis of the automotive headlamp, the automatic illumination axis adjusting means being adapted for adjusting the angle of the illumination axis in vertical directions, and the manual angle adjusting means being adapted for adjusting the angle of the illumination axis in horizontal directions.

According to a third aspect of the invention, there is provide an illumination axis adjusting apparatus for automotive headlamps comprising first automatic illumination axis adjusting means having integrally an automatic angle adjusting structure for automatically adjusting the angle of the illumination axis of an automotive headlamp in horizontal directions and a manual angle adjusting structure for manually adjusting the angle of the illumination axis of the automotive headlamp, and second automatic illumination axis adjusting means having integrally an automatic angle adjusting structure for automatically adjusting the angle of the illumination axis of the automotive headlamp in vertical directions and a manual angle adjusting structure for manually adjusting the angle of the illumination axis of the automotive headlamp.

According to a fourth aspect of the invention, there is provided an illumination axis adjusting apparatus for automotive headlamps as set forth in the second or third aspect of the invention, wherein the automatic illumination axis adjusting means is constituted by a stepping motor, the stepping motor having an output shaft, the output shaft being locked to a reflector of the automotive headlamp at one end thereof and having at a central portion thereof a threaded portion for receiving an axial force through the rotation of a rotor and at the other end thereof a rotary portion adapted to be rotated by a user.

According to a fifth aspect of the invention, there is provided an illumination axis adjusting apparatus for automotive headlamps as set forth in the fourth aspect of the invention, further having a sliding member in mesh engagement with the rotor to thereby move in axial directions in conjunction with the rotation of the rotor, as well as with the threaded portion provided at the central portion of the output shaft.

According to a sixth aspect of the invention, there is provided an illumination axis adjusting apparatus for automotive headlamps as set forth in the fifth aspect of the invention, wherein the sliding member is formed from a resin material.

According to a seventh aspect of the invention, there is provided an illumination axis adjusting apparatus for automotive headlamps as set forth in the fourth aspect of the invention, further comprising a manual rotary portion adapted to restrict the direction in which the output shaft rotates and to be rotated by the user.

According to an eighth aspect of the invention, there is provided an illumination axis adjusting apparatus for automotive headlamps as set forth in the seventh aspect of the invention, wherein an output shaft accommodating and holding hole is formed in the manual rotary portion so that the output shaft is accommodated and held in the output shaft accommodating and holding hole, and wherein cross-sectional shapes of the output shaft accommodating and holding hole and a portion of the output shaft which is inserted into the hole are substantially oval, D-shaped or polygonal.

According to a ninth aspect of the invention, there is provided an illumination axis adjusting apparatus for automotive headlamps as set forth in the seventh aspect of the invention, wherein the manual rotary portion is inserted and held in a hole portion opened in a housing at a position on the axis of the housing, and wherein the manual rotary portion is held with a dislocation preventing member for preventing the dislocation of the manual rotary portion from the housing.

According to a tenth aspect of the invention, there is provided an illumination axis adjusting apparatus for automotive headlamps as set forth in the ninth aspect of the invention, wherein a collar-like projection is disposed at an outer circumferential portion of the manual rotary portion, and wherein the dislocation preventing member is disposed such that the collar-like projection is rotatably held between an end surface of the housing and the dislocation preventing member.

According to an eleventh aspect of the invention, there is provided an illumination axis adjusting apparatus for automotive headlamps as set forth in the ninth aspect of the invention, wherein a pawl-like projection is provided on one of the dislocation preventing member and the housing, and wherein a recessed portion is formed in the other for mesh engagement with the pawl-like projection.

According to a twelfth aspect of the invention, there is provided an illumination axis adjusting apparatus for automotive headlamps as set forth in the seventh aspect of the invention, wherein a seal member formed of a resilient material is provided between the manual rotary portion and the housing.

According to a thirteenth aspect of the invention, there is provided an automotive headlamp system comprising left and right headlamps mounted on an automotive vehicle and illumination axis adjusting apparatus provided for the headlamps, respectively, wherein the illumination axis adjusting apparatus has automatic illumination axis adjusting means having integrally, in turn, an automatic angle adjusting structure for automatically adjusting the angle of the illumination axis of the headlamp in horizontal directions and a manual angle adjusting structure for manually adjusting the angle of the illumination axis of the headlamp, whereby in accordance with the number of degrees of an angle through which a steering wheel of an automotive vehicle is turned, when the steering wheel is turned rightward the illumination axis of the right-hand side headlamp is adjusted rightward, while when the steering wheel is turned leftward, the illumination axis of the left-hand side headlamp is adjusted leftward.

DETAILED DESCRIPTION OF THE PREFERRED EMBODIMENTS

Now, a description will be given in more detail of preferred embodiments of the invention with reference to the accompanying drawings.
(First Embodiment)

A first embodiment of the invention will be described below with reference to the accompanying drawings.

Figure 1:
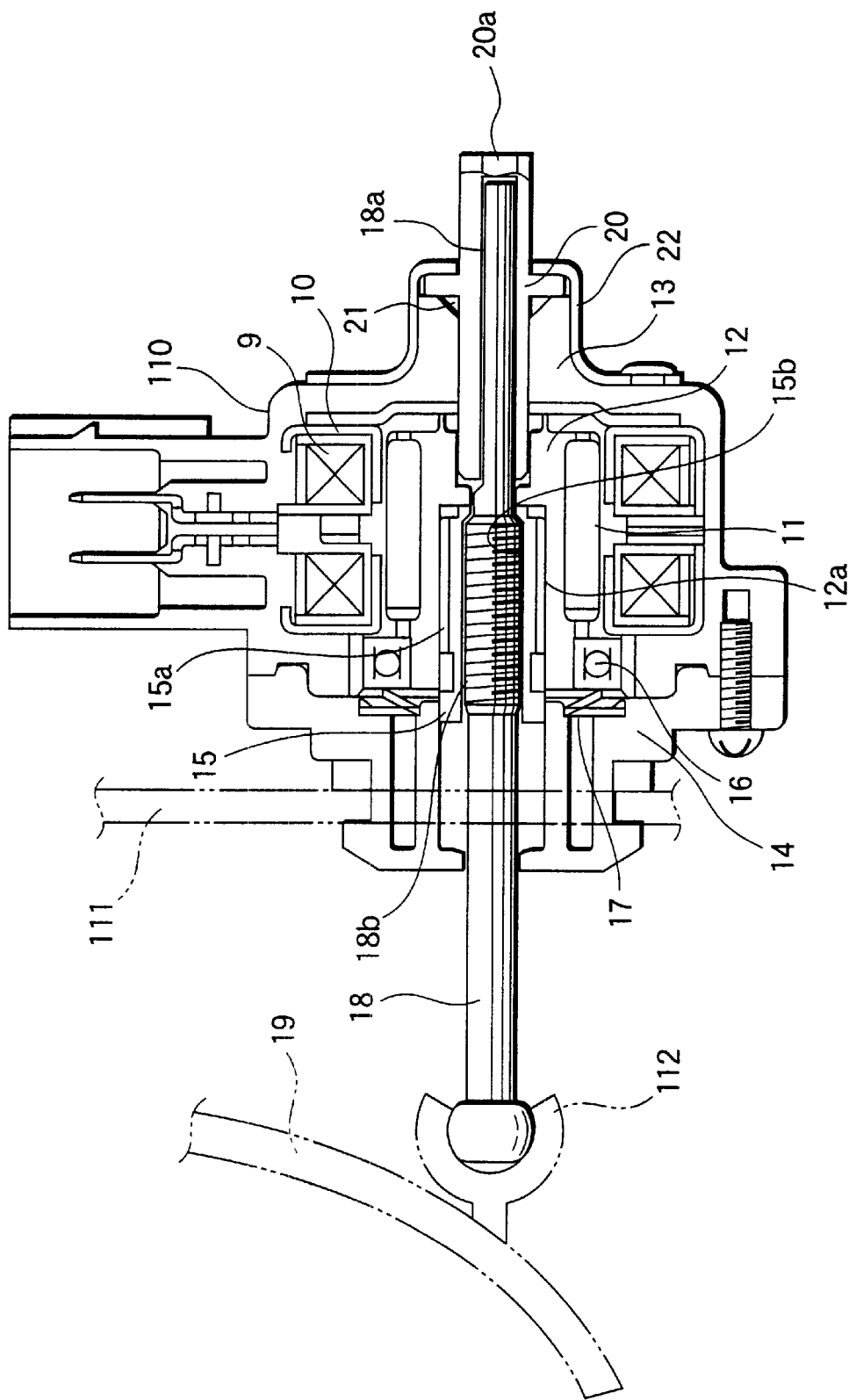
FIG. 1 is a schematic explanatory vertical cross-sectional view showing a stepping motor of a headlamp device according to a first embodiment of the invention.

Firstly, a description will be made with respect to FIG. 1 showing a cross-sectional view of a stepping motor.

In FIG. 1, reference numeral 9 denotes a coil which generates magnetic force when a stepping motor 110 is energized. Reference numeral 10 denotes a stator formed in such a manner as to envelop the coil 9 and adapted to accumulate magnetic force generated by the coil 9 to thereby become a magnetic pole. Reference numeral 11 denotes a permanent magnet opposing the magnetic pole generated at the stator 10 and adapted to rotate through attraction and repulsion of the magnetic force. Reference numeral 12 denotes a rotor holding the permanent magnet 11 and adapted to rotate together with permanent magnet 11. This rotor 12 is disposed rotatable relative to the stator 10. Reference numeral 12a denotes internal threads formed in an inner circumferential portion of the rotor 12. Reference numeral 13 denotes a housing holding integrally the stator 10 which envelops the coil 9 and constituting an external portion of the stepping motor 110.

Reference numeral 14 denotes a boss fixed to the housing 13 for mounting the stepping motor 110 on a lamp unit 111 for fixation thereto. Here, the lamp unit 111 is part of a lamp body of an automotive headlamp, not shown, and incorporated in the lamp body are a reflector, a bulb and an illuminating circuit of the bulb. Reference numeral 15 denotes a shaft (a sliding member/an automatic adjusting member) formed in an outer circumference thereof with external threads 15a for mesh engagement with the internal threads 12a the rotor 12, and since it is restrained in rotating directions by the boss 14, the shaft 15 can move only in axial directions. When the rotor 12 rotates, the shaft 15 is to move axially through the rotation of the rotor 12. Note that as a means for regulating the shaft 15 in the rotating directions a method may be adopted in which an inner circumference of the boss 14 and the outer circumference of the shaft 15 which is brought into abutment with the inner circumference of the boss 14 may be both formed into a quadrilateral shape. Reference numeral 15b denotes internal threads formed in an inner circumference of the shaft.

Reference numeral 16 denotes a bearing for rotatably holding the rotor 12 which is movable axially relative to the housing 13 and is fixed and held in axial directions relative to the rotor 12. Reference numeral 17 denotes a plate spring which is biased in an axial direction via the bearing 16. This plate spring 17 exerts at all times a predetermined resilient force in the axial direction to the rotor 12 and the bearing 16, and therefore positioning the rotor 12 in the axial direction can be attained with ease. In addition, influence from dimensional and assembling errors can be eliminated.

Reference numeral 18 denotes an output shaft (an output shaft member) having external threads 18b formed in an outer circumference of a central portion thereof for mesh engagement with the internal threads 15b of the shaft 15 and adapted to move in the axial direction together with the shaft 15 when the motor is energized. In addition, the output shaft 18 is tiltably fixed and locked to a reflector 19 via a joint portion 112, and when the motor is energized the output shaft 18 moves axially, which tilts the reflector of the lamp, whereby leveling adjustment can be implemented. Reference numeral 18a denotes a slidable connecting portion formed at an opposite end portion to the joint portion 112 of the output shaft 18 which is worked into a shape which can restrain the rotation of the output shaft 18.

Reference numeral 20 denotes a bush (a manual adjusting member/a rotary portion) having therein a connecting hole formed into such a configuration that axial back and forth movements of the slidable connecting portion 18a of the output shaft 18 are allowed, while rotations of the output shaft 18 about the axis thereof is restrained. The bush 20 has at an end portion thereof a hexagonal portion 20a which can be rotated by a mechanic and a user with a tool, and by so rotating the hexagonal portion 20 the output shaft 18 moves axially back and forth while rotating, whereby aiming adjustment is attained. Reference numeral 21 denotes a rubber ring (a seal member/a rotary resistance member) formed of rubber (a resilient material) which maintains the airtightness (or prevents the penetration of dust) between the housing 13 and the bush 20 and restrains the output shaft 18 from rotating by applying an appropriate sliding resistance to the rotation of the bush 20 in circumferential directions around the axis thereof while permitting the rotation thereof when the user inserts the tool on the hexagonal portion 20a so as to rotate the bush 20. Reference numeral 22 denotes a cover (a dislocation preventing member) fixed to the housing 13 for preventing the dislocation of the bush.

Next, the operation of the stepping motor will be described.

Firstly, the leveling adjusting mechanism will be described which automatically adjusts the illumination axis of the headlamp while the vehicle is running or the like.

When a signal is inputted in the stepping motor 110, electric current flows through the coil 9 and magnetic force is generated. The magnetic force so generated is then accumulated by the stator 10, and the stator 10 then comes to have S and N poles, whereby rotating torque is generated in the permanent magnet through attraction and repulsion between the S and N poles so generated in the stator 10 and the S and N poles in the surface of the permanent magnet 11 and the permanent magnet 11 moves to the next magnetically stable point, the rotor 12 being thereby allowed to rotate through a predetermined angle in a stepped fashion.

Then, the shaft 15 tries to rotate similarly which is in mesh engagement at the internal threads 15a thereof with the internal threads 12a formed in the central portion of the rotor 12 which rotates through the operation described above, but as this occurs, since the shaft 15 is allowed to move only in back and forth directions by being restrained from rotating by the boss 14, the shaft 15 then moves in the axial directions. When the shaft 15 moves in the axial directions, since the output shaft 18, which is in mesh engagement with the shaft 15 through the mesh engagement of the external threads 18b and the internal threads 15b, is also restrained from rotating by the bush 20, the shaft 15 and the output shaft 18 slide in the axial directions together, whereby the reflector 19 tiltably fixed to a distal end of the output shaft 18 (the output shaft member) tilts. This changes the vertical inclination of the reflector 19, whereby the reflecting angle of light emitted from the bulb thereof is changed, a leveling adjustment being thereby implemented.

Next, the aiming adjusting mechanism for adjusting the initial position of the illumination axis will be described.

When the hexagonal portion 20a of the bush 20 (the manual adjusting member) is rotated, the output shaft 18 connected to the bush 20 via the slidable connecting portion 18a which is formed so as to restrain the rotation of the output shaft 18 rotates together with the bush 20. Then, since the external threads on the threaded portion 18b of the output shaft 18 (the output shaft member) screw in the internal threads 15a in the shaft 15 (the automatic adjusting member) and furthermore since the shaft is restrained from rotating by the bush 14, the output shaft 18 is moved forward or rearward relative to the shaft 15 in accordance with the rotating direction of the hexagonal portion 20 of the bush 20, whereby aiming adjustment is implemented.

Here, since the output shaft 18 and the shaft 15 are constructed to move axially relative to each other, if a force required when the shaft 15 is moved axially is smaller than a force required when the output shaft 18 is moved axially, the output shaft 18 is allowed to move axially.

However, as seen from FIG. 1, the axial sliding range of the shaft 15 is restricted by the bush 14 and the rotor 12, respectively, and in implementing the aforesaid aiming adjustment, when the hexagonal portion 20a is rotated even if the output shaft 18 does not move axially relative to the housing 13 but if the shaft 15 moves relative to the housing 13, due to the aforesaid restriction on the sliding range of the shaft 15, appropriate adjustment can be attained at one of extremes of the restricted range.

Figure 2:
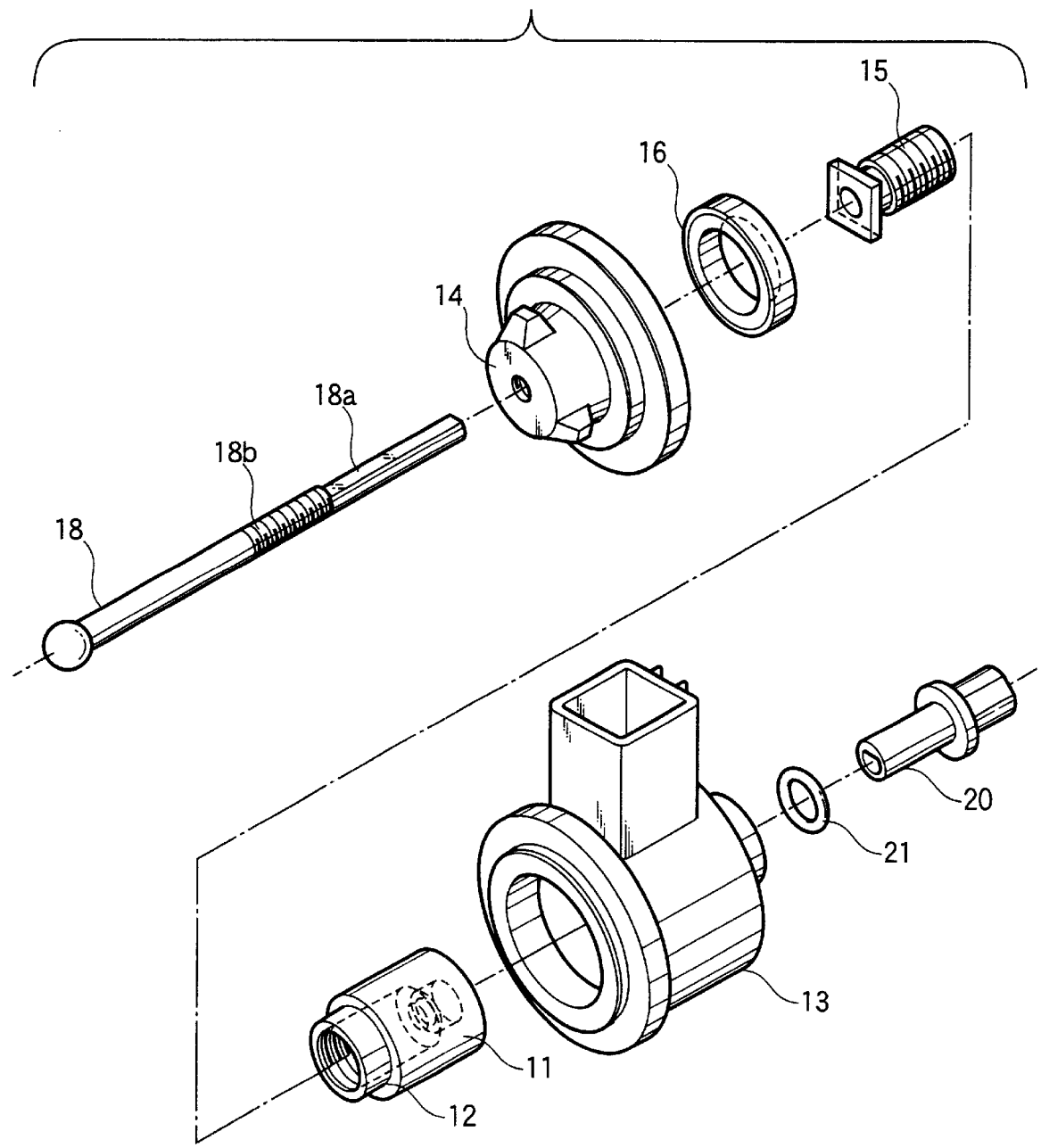
FIG. 2 is an enlarged exploded perspective view of a main part of the stepping motor of the headlamp device.

FIG. 2 shows an exploded perspective view of the stepping motor according to the first embodiment shown in FIG. 1. In the figure, denoted by the reference numerals 12, 13, 14, 15, 16, 18, 18a, 18b, 20 and 21 are, respectively, the rotor, the housing, the boss, the shaft (the automatic adjusting member), the bearing, the output shaft (the output shaft member), the slidable connecting portion, the threaded portion, the bush (the manual adjusting member) and the rubber ring (the seal member).

Thus, it is possible to provide the illumination axis adjusting apparatus using the manual and automatic integral type stepping motor in which the back and forth or longitudinal movements of the output shaft 18 (the output shaft member) can be implemented both manually and automatically with the single stepping motor by incorporating the aiming adjusting mechanism in the stepping motor itself, whereby the illumination axis direction of the reflector 19 can be adjusted to an appropriate position. This can simplify the fabrication of headlamps.

(Second Embodiment)

Figure 3:
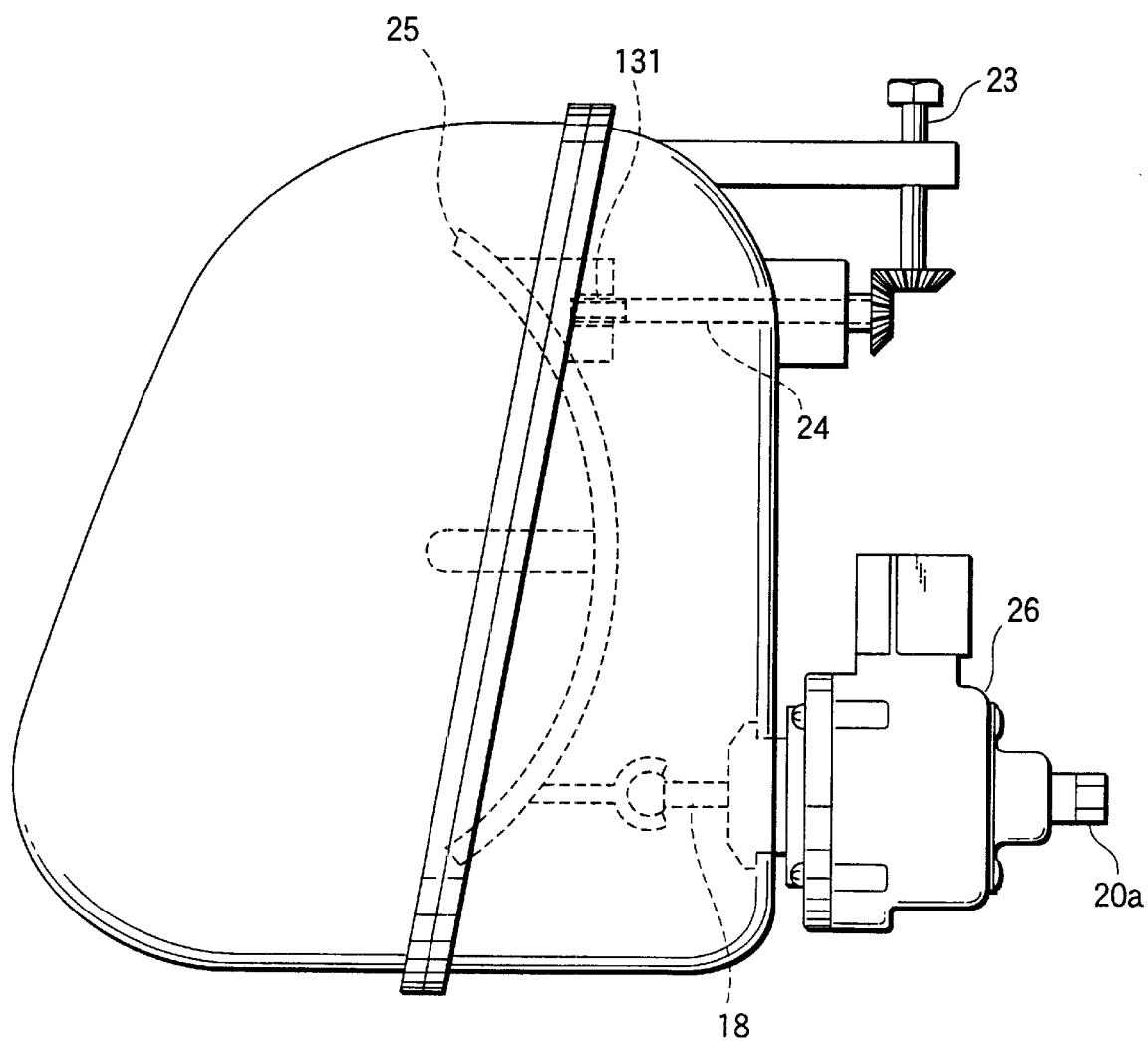
FIG. 3 is an explanatory view of the headlamp according to the first embodiment of the invention, as viewed from the side thereof.

FIG. 3 is a side perspective view showing an automotive headlamp.

Referring to FIG. 3, a second embodiment of the invention will be described below.

The second embodiment illustrates an example in which the stepping motor described in the first embodiment is applied to an automotive headlamp device.

In FIG. 3, reference numeral 23 denotes an operating shaft for a manual horizontal aiming adjusting mechanism. Reference numeral 24 denotes an adjusting rod which is in mesh engagement with the operating shaft via a gear. When the operating rod 23 is operated to rotate, the adjusting rod 24 rotates in a state in which the adjusting rod 24 is in mesh engagement with a threaded portion formed in a reflector 25, whereby the reflector 25 tilts horizontally about a straight line connecting a fulcrum 29 and an output shaft 27 of a stepping motor 26 as a fulcrum axis, a horizontal aiming adjustment being thereby implemented. In addition, reference numeral 26 denotes the stepping motor provided with both an aiming adjusting mechanism (manual) and a leveling adjusting mechanism (automatic) which is described in the first embodiment.

Reference numeral 27 denotes an output shaft of the stepping motor 26, and reference numeral 20a denotes a hexagonal portion for aiming adjustment. When the hexagonal portion 20a is operated to rotate, the output shaft 18 moves axially, whereby the reflector 25 tilts vertically about a straight line connecting the fulcrum 29 and the adjusting rod 24 as a fulcrum axis, a vertical aiming adjustment being thereby implemented manually. Note that when a signal is inputted in the stepping motor 26 the output shaft 18 moves axially, as well as the reflector 25 tilts, whereby a leveling adjustment can automatically be implemented.

Figure 4:
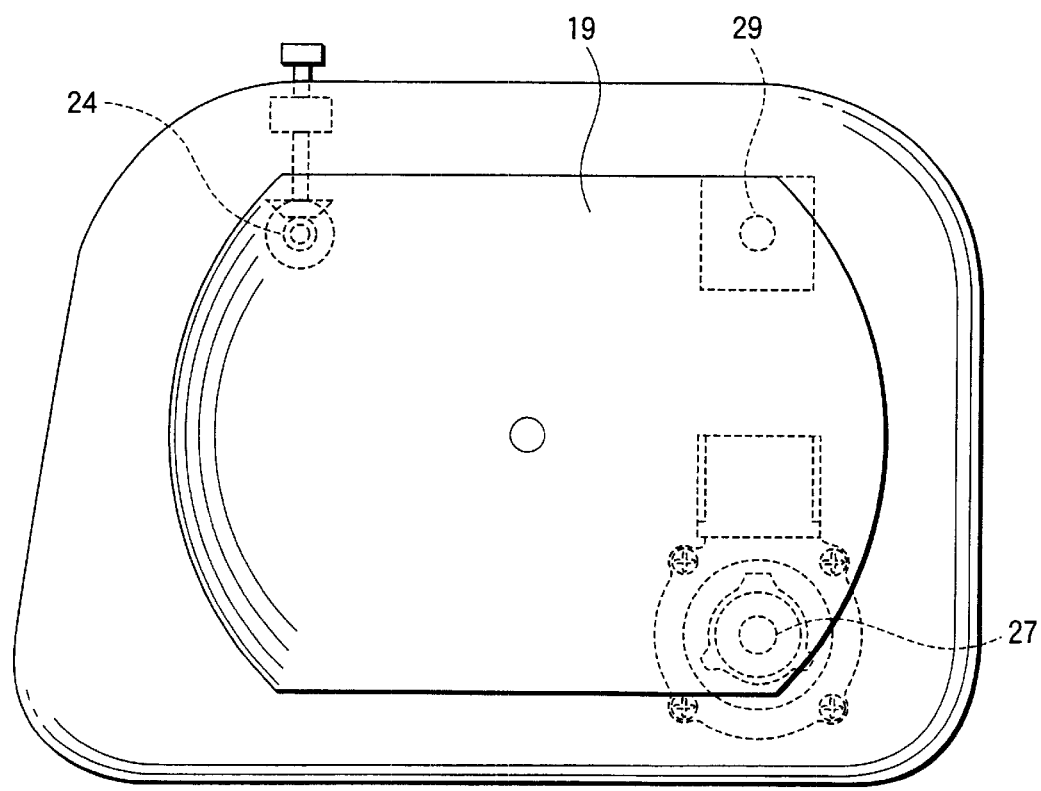
FIG. 4 is a partially perspective explanatory view of a headlamp according to a second embodiment of the invention, as viewed from the front thereof.

FIG. 4 is a front view of the automotive headlamp according to the second embodiment. In the figure, reference numeral 29 denotes the fulcrum. The reflector 19 is supported by the adjusting rod 24, the output shaft 18 and the fulcrum 29 in such a manner that the reflector 19 can tilt vertically and horizontally on the fulcrum 29 acting as a fulcrum.

In addition, here, both the adjusting rod 24 and the output shaft 18 are constructed to hold the reflector 19 at positions located as far away from the reflector 19 as possible, and therefore the tilting amount of the reflector 19 can be made smaller than the traveling amount of the adjusting rod 24 and the output shaft, thereby making it possible to implement finer adjustments.

(Third Embodiment)

Figure 5:
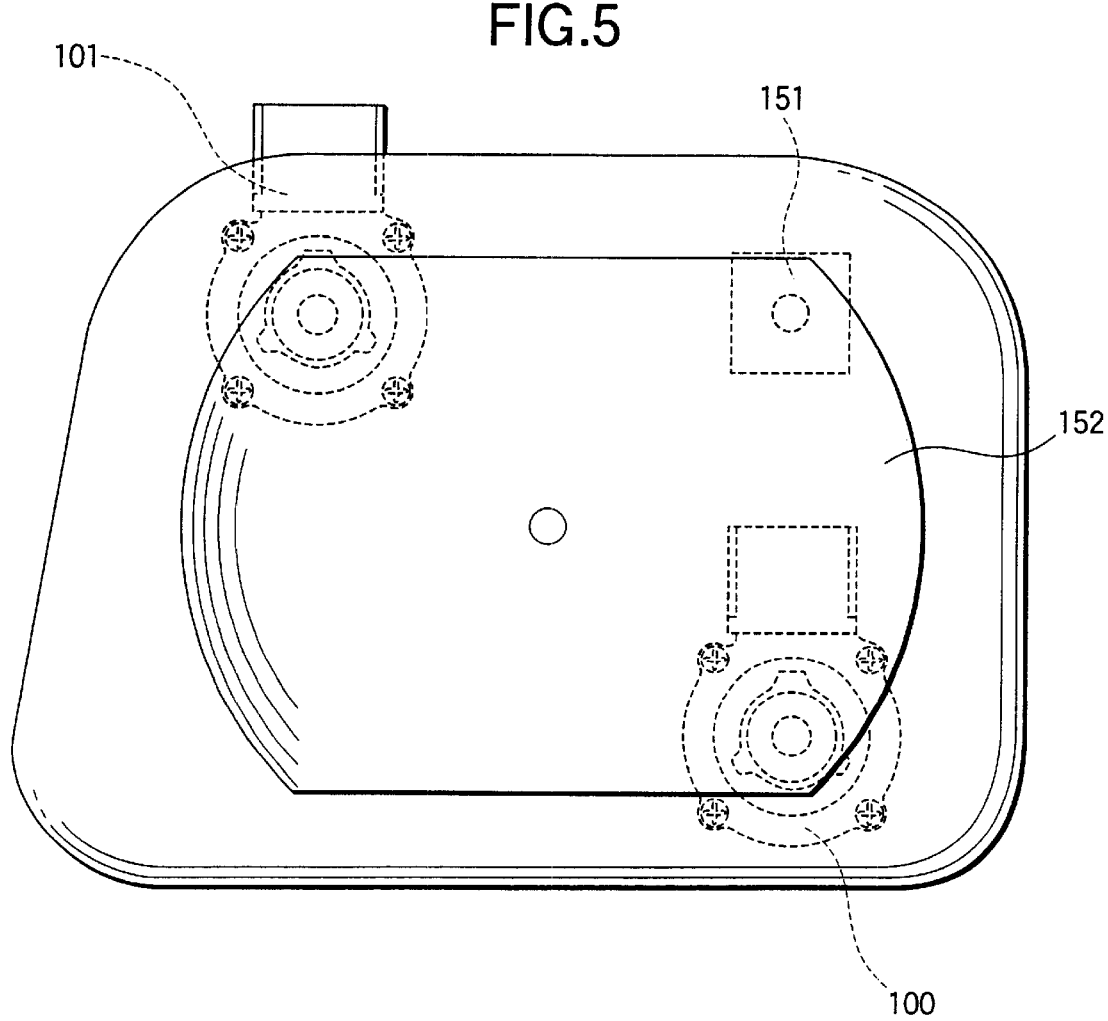
FIG. 5 is a partially perspective explanatory view of a headlamp according to a third embodiment of the invention, as viewed from the front thereof.

Referring to FIG. 5, a third embodiment will be described.

In FIG. 5, reference numeral 100 denotes a first stepping motor in which the stepping motor having both the manual and automatic adjusting mechanisms which is described in the first embodiment is used as a vertical illumination axis adjusting device.

In addition, reference numeral 101 denotes a second stepping motor in which the stepping motor having both the manual and automatic adjusting mechanisms which is described in the first embodiment is used as a horizontal illumination axis adjusting device and is disposed at a substantially diagonally opposite position to the first stepping motor 100 for adjusting the illumination axis vertically across the reflector.

Note that both the illumination axis adjusting devices 100, 101 are different from each other only in the illumination axis adjusting direction (namely, the position of their output shafts on the reflector (positional relationship with the fulcrum)) and the operation of both the devices is identical to that of the stepping motor described in the first embodiment, and therefore the description of the operation of those devices will be omitted here.

In addition, reference numeral 151 denotes a fulcrum for the horizontal and vertical tilting motions of the reflector 152.

Here, while the first and second illumination axis adjusting devices are described as being disposed at the substantially diagonally opposite positions to each other, the output shafts and fulcrums of the respective adjusting devices may be disposed to hold the reflector such that the output shaft of the stepping motor for adjusting the illumination axis in the horizontal directions is located at a position horizontally deviated relative to the fulcrum and that the output shaft of the stepping motor for adjusting the illumination axis in the vertical directions is located at a position vertically deviated relative to the fulcrum.

Note that the second stepping motor 101 shown in FIG. 5 is disposed for left and right headlamps of the vehicle, respectively, and is controlled so as to react to an angle through which the steering wheel is turned, although not shown. With the second stepping motors 101 of this steered angle reaction type being so provided, for example, while driving on a curved road, when the steering wheel is turned leftward, the horizontal illumination axis adjusting device for the left-hand side headlamp is controlled leftward appropriately, whereas when the steering wheel is turned rightward, the horizontal illumination axis adjusting device for the right-hand side headlamp is controlled rightward appropriately, whereby the road ahead of the vehicle which is turning around a curved corner is illuminated and the road condition ahead of the turning vehicle can be confirmed at an earlier opportunity.

(Fourth Embodiment)

Next, referring to FIGS. 6A to 6C, a fourth embodiment will be described.

Figure 6A:
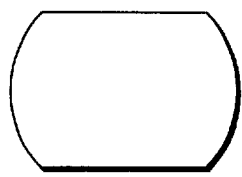
FIGS. 6A to 6C are explanatory views showing cross-sectional configurations of an output shaft according to a fourth embodiment of the invention.
Figure 6B:
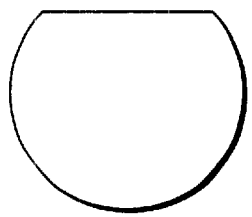
Figure 6C:
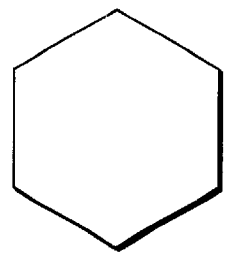

FIGS. 6A to 6C show axial cross sections of the slidable connecting portions 18a of the output shafts 18 (the output shaft members) within the bush 20 which are used in the automotive headlamp devices according to the first to third embodiments, respectively. In FIGS. 6A to 6C, reference character a denotes a substantially oval shape, reference character b a substantially D-shape, and reference character c a polygonal shape.

Note that any other shapes may be used provided that they restrain the relative rotation of the output shaft 18 inserted into the bush 20 while permitting the axial movement thereof.

(Fifth Embodiment)

Next, referring to FIGS. 7A to 7C, a fifth embodiment will be described.

Figure 7A:
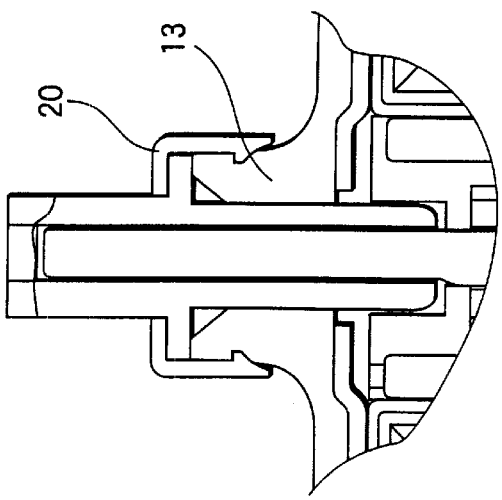
FIGS. 7A to 7C are explanatory views showing cross-sectional configurations of the periphery of a bush according to a fifth embodiment of the invention.
Figure 7B:
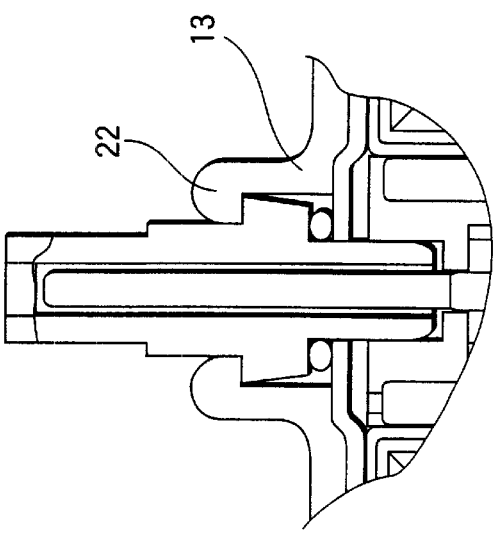
Figure 7C:
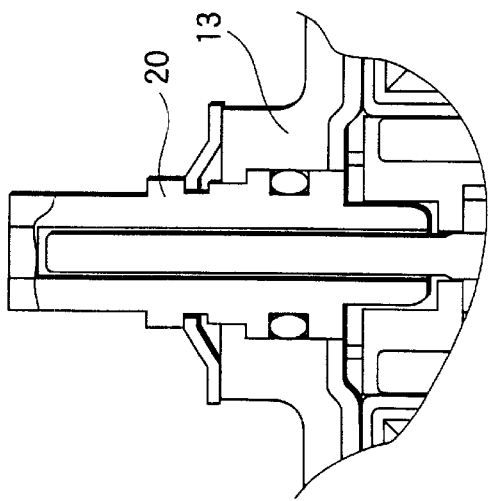
Figure 8:
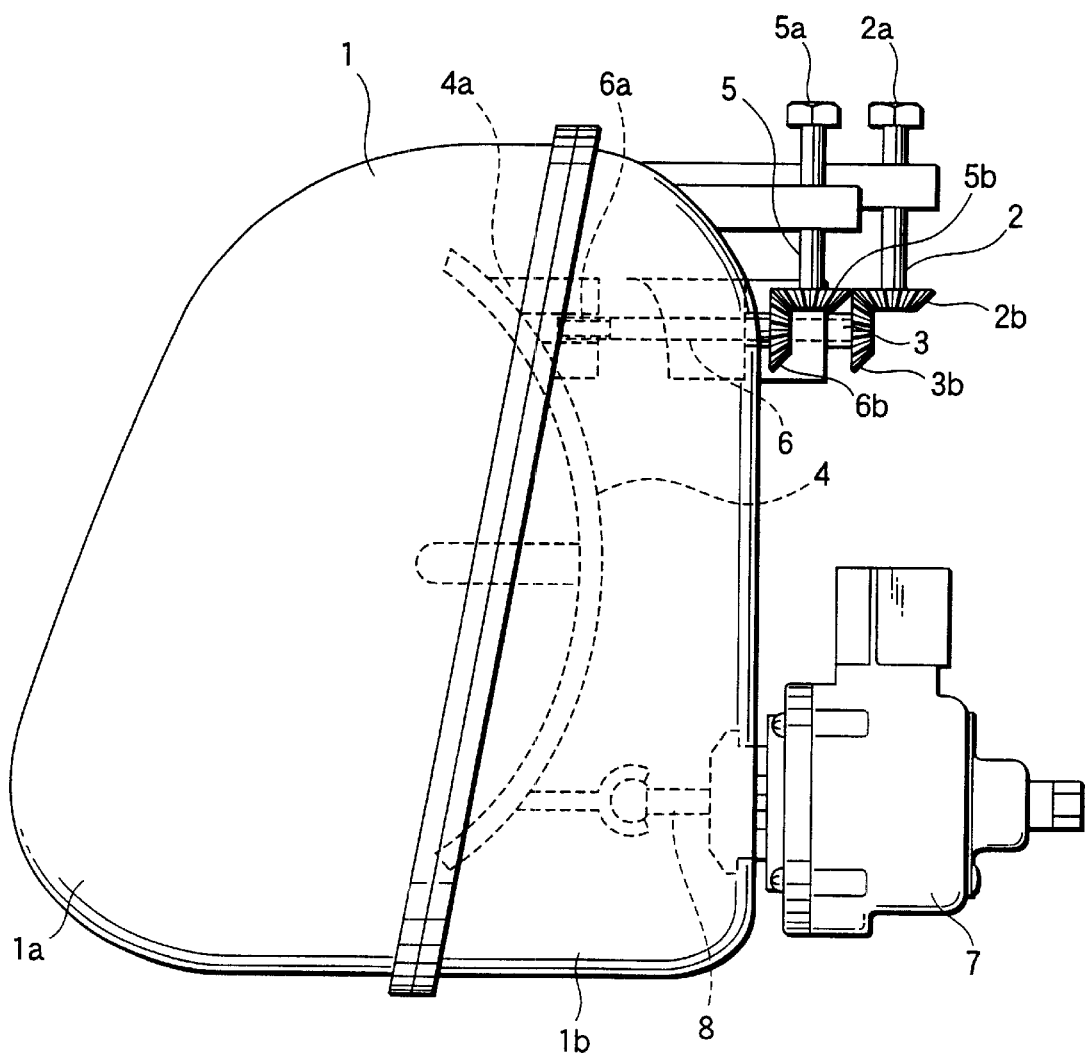
FIG. 8 is a vertical cross-sectional view showing one example of a prior art headlamp device.

FIGS. 7A, 7B and 7C show modified examples of the dislocation preventing structure used in the automotive headlamp devices according to the first to third embodiments, respectively.

Here, FIG. 7A shows a dislocation preventing structure in which the dislocation from the bush 20 is prevented by pushing a ring-like sheet or a so-called push nut in the bush 20 projecting from the housing 13.

FIG. 7B shows a dislocation preventing structure in which fastening is implemented by a so-called snap fit system wherein a pawl portion of a resin cover 22 which is a dislocation preventing means is brought in to a mesh engagement with a recessed portion in the housing 13.

FIG. 7C shows a dislocation preventing structure adopting a dislocation preventing means constructed such that a collar portion of the bush portion 20 is brought into mesh engagement with a pawl portion projecting inwardly into a hole portion of the housing 13. Note that the configurations of the housing 13 pawl portion, the collar portion of the bush 20 and the inserting side of the bush 20 are not limited to those shown in the figure.

In addition, according to the respective embodiments, there is provided an illumination axis adjusting apparatus for headlamps mounted on a vehicle comprising a stepping motor type illumination axis adjusting mechanism constituted integrally by both an automatic leveling adjusting function for automatically adjusting the angle of the illumination axis direction in response to a change in the posture of the running vehicle when receiving an electric signal and a manual aiming adjusting mechanism for manually adjusting the angle of the illumination axis direction of a headlamp at the time of fabricating or inspecting vehicles. Thus, the mounting space can be reduced and the degree of freedom in designing a lamp device can be improved remarkably by providing, for the purpose of changing the illumination axis of a headlamp, integrally the leveling adjusting mechanism for adjusting the illumination axis of the headlamp while the vehicle is running and the aiming adjusting mechanism for manually adjusting the initial position of the illumination axis of the headlamp.

Furthermore, according to the respective embodiments, there is provided an illumination axis adjusting apparatus for headlamps mounted on a vehicle having a manual aiming mechanism for manually changing the illumination axis direction of a headlamp either horizontally or vertically and comprising a stepping motor type leveling mechanism constituted integrally by an automatic leveling adjusting function for automatically adjusting the illumination axis direction of the headlamp either horizontally or vertically in response to a change in the posture of the running vehicle when receiving an electric signal and a manual aiming adjusting mechanism for manually adjusting the angle of the illumination axis of a headlamp at the time of fabricating or inspecting a vehicle. Thus, the necessity of the components and mounting space required for the vertical manual adjusting device can be obviated by providing the manual adjusting device for manually adjusting the illumination axis of the headlamp in horizontal directions and the stepping motor type illumination axis adjusting device for adjusting the illumination axis of the headlamp both manually and automatically in the vertical directions.

In addition, according to the respective embodiments, there is provided an illumination axis adjusting apparatus for headlamps mounted on an a vehicle comprising a first stepping motor type illumination axis adjusting device constituted integrally by an automatic leveling adjusting function for automatically adjusting the angle of the illumination axis of the headlamp in vertical directions in response to a change in the posture of the running vehicle when receiving an electric signal and a manual aiming adjusting function for manually adjusting the angle of the illumination axis of the headlamp in the vertical directions at the time of fabricating or inspecting a vehicle and a second stepping motor type illumination axis adjusting device constituted integrally by an automatic leveling adjusting function for automatically adjusting the angle of the illumination axis of the headlamp in the horizontal directions in response to a change in the horizontal posture of a vehicle running windingly when receiving an electric signal and a manual aiming adjusting function for manually adjusting the angle of the illumination axis of the headlamp in the horizontal directions at the time of fabricating or inspecting a vehicle. Thus, for example when driving the vehicle on a curved road, the function can be provided for automatically adjusting the illumination axis toward the direction in which the steering wheel is turned, whereby the visibility of the driver can be improved remarkably, the safety being thereby increased by disposing the second stepping motor for adjusting the direction of the illumination axis of the headlamp both manually and automatically in the horizontal directions for the left and right headlamps of the vehicle.

Furthermore, according to the respective embodiments of the invention, there is provided an illumination axis adjusting apparatus for headlamps mounted on an a vehicle having an illumination axis adjusting device using a steered angle reaction type stepping motor which has a vertical illumination axis adjusting device having a manual adjusting function and an automatic adjusting function incorporated integrally therein and a horizontal illumination axis adjusting device having a manual adjusting function and an automatic adjusting function incorporated integrally therein, wherein while running windingly, when the steering wheel is turned leftward, the illumination axis of the left-hand side headlamp is automatically adjusted leftward by the horizontal illumination axis adjusting device provided for the left-hand side headlamp, whereas when the steering wheel is turned rightward the illumination axis of the right-hand side headlamp is automatically adjusted rightward by the horizontal illumination axis adjusting device provided for the right-hand side headlamp. Thus, since the illumination axis adjusting apparatus employing the steered angle reaction type stepping motor is used, for example, when running windingly, the function can be provided for automatically adjusting the illumination axis of the headlamp toward the direction in which the steering wheel is turned, whereby the visibility of the driver can be improved remarkably, the safety being thereby increased.

Furthermore, the adjusting mechanism of the first or second stepping motor type illumination axis adjusting device is the stepping motor type illumination axis adjusting mechanism in which the reflector of the headlamp is locked to one side of the output shaft member, in which external threads are formed substantially in a central portion of the output shaft member for converting the rotation of a rotor into an axial movement, in which an automatic adjusting member is disposed which has internal threaded portion adapted be brought into mesh engagement with the external threaded portion, and in which the other end of the output shaft member is inserted into a manual adjusting member for accommodating and holding the output shaft member in such a manner that the output shaft cannot rotate relatively. Thus, the adjusting rods and gears constituting the conventional vertical aiming adjusting mechanism are eliminated, thereby simplifying the fabrication of the illumination axis adjusting apparatus. In addition, in the stepping motor, the rotating shaft for leveling adjustment and the output shaft for vertical adjustment are constructed in a two-layer fashion, thereby saving the mounting space and facilitating the fabrication of the illumination axis adjusting apparatus. Thus, reducing costs and saving the mounting space can be attained.

Additionally, according to the respective embodiments, the automatic adjusting member adapted to convert the rotation of the rotor into the axial movement and having the internal threaded portion adapted to be brought into mesh engagement with the external threaded portion is formed from a resin material. Thus, since the automatic adjusting member of the illumination axis adjusting device using the stepping motor is made from resin, the productivity is improved remarkably, thereby making it possible to reduce the cost of the apparatus.

In addition, according to the respective embodiments, the automatic adjusting member adapted to convert the rotation of the rotor into the axial movement and having the internal threaded portion adapted to be brought into mesh engagement with the external threaded portion is formed from a resin material constituted mainly by PPS. Thus, since the automatic adjusting member of the illumination axis adjusting device using the stepping motor is made from the PPS resin, the sliding properties and durability of the treaded portion of the automatic adjusting member can be improved, thereby making it possible to provide a reliable hybrid type illumination axis adjusting apparatus.

Additionally, according to the respective embodiments, the automatic adjusting member adapted to convert the rotation of the rotor into the axial movement and having the internal threaded portion adapted to be brought into mesh engagement with the external threaded portion is produced through metal injection molding (MIM) which is a method comprising the steps of molding a resin material containing a large amount of metallic particles and thereafter calcining the resin material so molded. Thus, since the automatic adjusting member of the illumination axis adjusting device using the stepping motor is produced through metal injection molding, the strength of the threaded portion can be secured sufficiently, and for example, a complicated thread structure such as a square thread and a multi-start thread can be used.

According to the respective embodiments, an output shaft accommodating and holding hole in the manual adjusting member and an insertion portion of the output shaft member inserted and held in the accommodating and holding hole are substantially oval, or the output shaft accommodating and holding hole in the manual adjusting member and the insertion portion of the output shaft member inserted and held in the accommodating and holding hole are substantially D-shaped, or the output shaft accommodating and holding hole in the manual adjusting member and the insertion portion of the output shaft member inserted and held in the accommodating and holding hole are substantially polygonal. Thus, the inserting and fitting configuration between the output shaft member of the illumination axis adjusting device employing the stepping motor is made substantially oval, D-shaped or polygonal, whereby when the manual adjusting member and the output shaft moves relative to each other, they are allowed to move axially relative to each other while being allowed to rotate together in the rotating directions.

In addition, according to the respective embodiments, the manual adjusting member is inserted and held in a hole portion opened in a position on the axis of a housing and is provided with a dislocation preventing means for preventing the dislocation of the manual adjusting member from the housing, and a metallic cover, a resin cover or the lie is provided for holding relatively rotatably a collar portion of the manual adjusting member of the illumination axis adjusting device employing the stepping motor between the housing and itself, whereby the occurrence of a drawback can be prevented that the manual adjusting member is dislocated and falls from the housing due to vibrations of the vehicle.

According to the respective embodiments, a collar-like projection is disposed on an outer circumferential portion of the manual adjusting member as the dislocation preventing means for the manual adjusting member, and a dislocation preventing member comprising a metallic cover is provided for holding relatively rotatably the collar-like projection between an end face of the housing and itself. The cover as the dislocation preventing means is made of sheet metal. In addition, a collar-like projection is disposed on an outer circumferential portion of the manual adjusting member as the dislocation preventing means for the manual adjusting member, and a dislocation preventing member comprising a resin cover is provided for holding relatively rotatably the collar-like projection between an end face of the housing and itself. In addition, a snap fit type fastening means is provided in which a pawl-like projection is provided on one of the resin cover which is the dislocation preventing member and the housing, whereas a concave fastening portion is formed in the other so as to be brought into mesh engagement with the pawl-like projection. Furthermore, as the dislocation preventing means for the manual adjusting member part of the manual adjusting member is rotatably supported on part of the housing in such a manner that the axial movement is prohibited while the rotation thereof is allowed. Additionally, as the dislocation preventing member for the manual adjusting member a collar-like projection is provided on the outer circumferential portion of the manual adjusting member and a fitting portion is formed in a hole portion in a side of the housing so that the collar-like projection fits therein. Thus, the metallic cover, resin cover or the like for holding relatively rotatably the collar portion of the manual adjusting member of the illumination axis adjusting device employing the stepping motor between the housing and itself is made to be fixed through a one-touch or single operation, whereby the fabrication of the apparatus can be simplified, thereby making it possible to provide products with high productivity.

Additionally, according to the respective embodiments, the manual adjusting member is inserted and held in a hole portion formed in a position on the axis of the housing so as to provide a dislocation preventing means for preventing the dislocation of the manual adjusting member from the housing, as well as a water proof means for preventing the penetration of water from the dislocation preventing member. Thus, a seal member such as a rubber seal is disposed so as to be relatively rotatably held between the collar portion of the manual adjusting member of the illumination axis adjusting device employing the stepping motor and the housing, so that the penetration of water from a gap between the manual adjusting member and the housing is prevented, whereby products can be obtained which remarkably improve their reliability.

In addition, according to the respective embodiments, a seal member comprising a rubber seal is provided as a water proof means which is interposed between a collar-like projection provided on the outer circumference of the manual adjusting member and the housing, and the seal member so interposed as the water proof means is constructed so as to apply a predetermined load relative to the rotation of the manual adjusting member. Thus, since the seal member adapted to be held relatively rotatably between the collar portion on the manual adjusting member of the illumination axis adjusting device employing the stepping motor and the housing is constructed so as to apply the predetermined load to the rotation of the manual adjusting member, the unnecessary rotation of the manual adjusting member resulting from vibrations of the vehicle can be prevented, thereby making it possible to appropriately control the illumination axis adjusting apparatus in response to the posture of the vehicle running.

According to the respective embodiments, the thread pitch of the automatic adjusting member adapted to convert rotations of the rotor into axial movements and having internal threads which are to be brought into mesh engagement with external threads on the output shaft is made to be at least 1 mm or greater, and the thread pitch of a portion where the output shaft member of the illumination axis adjusting device employing the stepping motor and the automatic adjusting member are brought into thread engagement with each other is made to be 1 mm or greater, so that the illumination axis adjusting amount per rotation in manually adjusting the illumination axis direction with a wrench is set large, whereby a time required for adjusting work can be reduced, the working efficiency being thereby improved.

Since the illumination axis adjusting apparatus for automotive headlamps according to the invention has the stepping motor comprising integrally the automatic angle adjusting structure and the manual angle adjusting structure, the construction of the apparatus can be simplified, and additionally the lay out of the apparatus can be facilitated.

Additionally, since both the structures are integrally provided on the stepping motor, the process of assembling the apparatus to the headlamp can be simplified.

In addition, the illuminating angle can be adjusted automatically in the vertical directions by the automatic illumination axis adjusting means having the automatic angle adjusting structure for automatically adjusting the angle of the illumination axis, whereby blinding the driver of an oncoming vehicle can be prevented with the simplified and miniaturized construction which would be caused by the headlamps whose illumination axes are directed upwardly when the vehicle inclines longitudinally when a number of pieces of luggage are put in the luggage compartment or running on the slope.

Additionally, since there are provided the first automatic illumination axis adjusting means having integrally the automatic angle adjusting structure for automatically adjusting the angle of the illumination axis of the automotive headlamp in horizontal directions and the manual angle adjusting structure for manually adjusting the angle of the illumination axis of the automotive headlamp, and the second automatic illumination axis adjusting means having integrally the automatic angle adjusting structure for automatically adjusting the angle of the illumination axis of the automotive headlamp in vertical directions and the manual angle adjusting structure for manually adjusting the angle of the illumination axis of the automotive headlamp, the angle of the illumination axis can automatically be adjusted in horizontal and vertical directions, whereby blinding the drivers of oncoming vehicles can be prevented that would be caused when the illumination axes of the headlamps are directed too upwardly and the sufficient illumination of the road ahead of the vehicle turning around a corner can be attained with the simplified and miniaturized construction.

In addition, since the automatic illumination axis adjusting means is constituted by the stepping motor, the stepping motor having the output shaft, the output shaft being locked to the reflector of the automotive headlamp at one end thereof and having at the central portion thereof the threaded portion for receiving the axial force through the rotation of the rotor and at the other end thereof the rotary portion adapted to be rotated by a user, the automatic illumination axis adjusting means for implementing both the manual and automatic adjustments can be obtained with the simple construction, and since the rotary portion is located at the other end which is the opposite side to the reflector, the rotary portion can be disposed at a position which facilitates the operation thereof by the user.

Additionally, since there is provided a sliding member in mesh engagement with the rotor to thereby move in axial directions in conjunction with the rotation of the rotor, as well as with the threaded portion provided at the central portion of the output shaft, the number of threads between the rotor and the sliding member and the number of threads between the sliding member and the output shaft can be differentiated, and therefore, the numbers of threads can be set in accordance with the properties of the stepping motor and the properties of the rotary portion.

In addition, since the sliding member is formed from the resin material, the wear of the output shaft and the rotor can be reduced in the event that the output shaft and the rotor are formed of metal.

Additionally, since there is also provided the manual rotary portion adapted to restrict the direction in which the output shaft rotates and to be rotated by the user, the number of components can be reduced.

In addition, since the output shaft accommodating and holding hole is formed in the manual rotary portion so that the output shaft is accommodated and held in the output shaft accommodating and holding hole, and since the cross-sectional shapes of the output shaft accommodating and holding hole and the portion of the output shaft which is inserted into the hole are made to be substantially oval, D-shaped or polygonal, configurations can be obtained through simple work which can securely restrict the rotating direction of the output shaft and facilitate the axial siding thereof.

Furthermore, since the manual rotary portion is inserted and held in the hole portion opened in the housing at the position on the axis of the housing and is held with the dislocation preventing member for preventing the dislocation of the manual rotary portion from the housing, the dislocation of the manual adjusting member can be prevented through the simple assembling process.

Moreover, since the collar-like projection is disposed at the outer circumferential portion of the manual rotary portion, and since the dislocation preventing member is disposed such that the collar-like projection is rotatably held between the end surface of the housing and the dislocation preventing member, the manual adjusting member can be held while being imparted a suitable resistance in the rotating direction.

Additionally, since the pawl-like projection is provided on one of the dislocation preventing member and the housing, while the recessed portion is formed in the other for mesh engagement with the pawl-like projection, the secure fixation can be attained through easy assembling work.

In addition, since the seal member formed of the resilient material is provided between the manual rotary portion and the housing, the closing properties of the stepping motor can be improved, and a suitable resistance can be imparted to the manual adjusting member in the rotating direction.

Additionally, since there is provided the automotive headlamp system comprising the left and right headlamps mounted on the automotive vehicle and the illumination axis adjusting apparatus provided for the headlamps, respectively, wherein the illumination axis adjusting apparatus has the automatic illumination axis adjusting means having integrally, in turn, the automatic angle adjusting structure for automatically adjusting the angle of the illumination axis of the headlamp in horizontal directions and the manual angle adjusting structure for manually adjusting the angle of the illumination axis of the headlamp, whereby in accordance with the number of degrees of an angle through which the steering wheel of the automotive vehicle is turned, when the steering wheel is turned rightward the illumination axis of the right-hand side headlamp is adjusted rightward, while when the steering wheel is turned leftward, the illumination axis of the left-hand side headlamp is adjusted leftward, the sufficient illumination of the road ahead of the vehicle turning around the corner can be attained with the simplified and miniaturized construction.

What is claimed is:

1. An illumination axis adjusting apparatus for automotive headlamps comprising:
   an automatic illumination axis adjustor having an automatic angle adjusting structure, comprising a motor with a rotor, for automatically adjusting the angle of the illumination axis of an automotive headlamp and a manual angle adjusting structure for manually adjusting the angle of the illumination axis of said automotive headlamp, said automatic angle adjusting structure and said manual angle adjusting structure being integrated together, and connected to an output shaft that effects movement of a portion of the headlamp, wherein said rotor extends along a longitudinal axis that is parallel to a longitudinal axis of said output shaft; and
   a manual angle adjustor for manually adjusting the angle of the illumination axis of said automotive headlamp, said automatic illumination axis adjustor being adapted for adjusting the angle of said illumination axis in vertical directions, and said manual angle adjustor being adapted for adjusting the angle of said illumination axis in horizontal directions.

2. An illumination axis adjusting apparatus for automotive headlamps as set forth in claim 1, wherein said automatic illumination axis adjustor comprises a stepping motor, said stepping motor having an output shaft, said output shaft being locked to a reflector of said automotive headlamp at one end thereof and having at a central portion thereof a threaded portion for receiving an axial force through the rotation of a rotor and at the other end thereof a rotary portion adapted to be rotated by a user.

3. An illumination axis adjusting apparatus for automotive headlamps as set forth in claim 2, further comprising a sliding member in mesh engagement with said rotor to thereby move in axial directions in conjunction with the rotation of said rotor, as well as with said threaded portion provided at the central portion of said output shaft.

4. An illumination axis adjusting apparatus for automotive headlamps as set forth in claim 3, wherein said sliding member is made of a resin material.

5. An illumination axis adjusting apparatus for automotive headlamps as set forth in claim 2, further comprising a manual rotary portion adapted to restrict the direction in which said output shaft rotates and to be rotated by the user.

6. An illumination axis adjusting apparatus for automotive headlamps as set forth in claim 5, wherein an output shaft accommodating and holding hole is formed in said manual rotary portion so that said output shaft is accommodated and held in said output shaft accommodating and holding hole; and
   wherein cross-sectional shapes of said output shaft accommodating and holding hole and a portion of said output shaft which is inserted into said hole are substantially oval, D-shaped or polygonal.

7. An illumination axis adjusting apparatus for automotive headlamps as set forth in claim 5, wherein a seal member formed of a resilient material is provided between said manual rotary portion and said housing.

8. An illumination axis adjusting apparatus for automotive headlamps as set forth in claim 5, wherein said manual rotary portion is inserted and held in a hole portion opened in a housing at a position on the axis of said housing; and wherein said manual rotary portion is held with a dislocation preventing member for preventing the dislocation of said manual rotary portion from said housing.

9. An illumination axis adjusting apparatus for automotive headlamps as set forth in claim 8, wherein a collar-like projection is disposed at an outer circumferential portion of said manual rotary portion; and wherein said dislocation preventing member is disposed such that said collar-like projection is rotatably held between an end surface of said housing and said dislocation preventing member.

10. An illumination axis adjusting apparatus for automotive headlamps as set forth in claim 8, wherein a pawl-like projection is provided on one of said dislocation preventing member and said housing; and wherein a recessed portion is formed in the other for mesh engagement with said pawl-like projection.

11. An illumination axis adjusting apparatus for automotive headlamps comprising:

a first automatic illumination axis adjustor having a first automatic angle adjusting structure for automatically adjusting the angle of the illumination axis of an automotive headlamp in horizontal directions and a first manual angle adjusting structure for manually adjusting the angle of the illumination axis of said automotive headlamp, said first automatic angle adjusting structure and said first manual angle adjusting structure being integrated together; and a second automatic illumination axis adjustor having a second automatic angle adjusting structure for automatically adjusting the angle of the illumination axis of said automotive headlamp in vertical directions and a second manual angle adjusting structure for manually adjusting the angle of the illumination axis of said automotive headlamp, said second automatic angle adjusting structure and said second manual angle adjusting structure being integrated together.

12. The illumination axis adjusting apparatus as set forth in claim 11, wherein the illumination axis adjusting apparatus is applied to an automotive headlamp system comprising left and right headlamps mounted on an automotive vehicle;

the illumination axis adjusting apparatus is provided for each of said headlamps respectively; and in accordance with the number of degrees of an angle through which a steering wheel of an automotive vehicle is turned, when the steering wheel is turned rightward the illumination axis of said right-hand side headlamp is adjusted rightward, while when the steering wheel is turned leftward, the illumination axis of said left-hand side headlamp is adjusted leftward.

13. An illumination axis adjusting apparatus for automotive headlamps as set forth in claim 11, wherein one of said first and second automatic angle adjusting structures comprises a motor with a rotor, and further wherein said one of said first and second automatic angle adjusting structures and a corresponding one of said first and second manual angle adjusting structures are connected to an output shaft that effects movement of a portion of the headlamp, wherein said rotor extends along a longitudinal axis that is parallel to a longitudinal axis of said output shaft.

14. An illumination axis adjusting apparatus for automotive headlamps as set forth in claim 11, wherein one of said first and second automatic angle adjusting structures comprises a motor with a rotor, and further wherein said one of said first and second automatic angle adjusting structures and a corresponding one of said first and second manual angle adjusting structures are connected to an output shaft that effects movement of a portion of the headlamp, wherein there is no more than one ball joint between said portion of the headlamp and said motor.

15. An illumination axis adjusting apparatus for automotive headlamps, comprising:

a stepping motor, said stepping motor comprising a rotor;

an automatic angle adjusting structure, for automatically adjusting the angle of the illumination axis of an automotive headlamp, connected to said motor; and a manual angle adjusting structure for manually adjusting the angle of the illumination axis of said automotive headlamp;

wherein said automatic angle adjusting structure and said manual angle adjusting structure are integrated together, and are connected to an output shaft that effects movement of a portion of the headlamp, and further wherein said rotor extends along a longitudinal axis that is parallel to a longitudinal axis of said output shaft.

16. The illumination axis adjusting apparatus as set forth in claim 1, wherein the illumination axis adjusting apparatus is applied to an automotive headlamp system comprising left and right headlamps mounted on an automotive vehicle;

the illumination axis adjusting apparatus is provided for each of said headlamps respectively; and in accordance with the number of degrees of an angle through which a steering wheel of an automotive vehicle is turned, when the steering wheel is turned rightward the illumination axis of said right-hand side headlamp is adjusted rightward, while when the steering wheel is turned leftward, the illumination axis of said left-hand side headlamp is adjusted leftward.

* * * * *

UNITED STATES PATENT AND TRADEMARK OFFICE
CERTIFICATE OF CORRECTION

PATENT NO.    : 6,641,292 B2         Page 1 of 1
DATED         : November 4, 2003
INVENTOR(S)   : Katsuya Miki, Hirofumi Doi and Mutsuo Sekiya It is certified that error appears in the above-identified patent and that said Letters Patent is hereby corrected as shown below:

<u>Title page,</u>
Insert Item:

[73] Assignee:  Mitsubishi Denki Kabushiki Kaisha --

Signed and Sealed this

First Day of June, 2004

JON W. DUDAS
*Acting Director of the United States Patent and Trademark Office*